(12) United States Patent
Beattie et al.

(10) Patent No.: US 6,226,051 B1
(45) Date of Patent: May 1, 2001

(54) DIGITAL VIDEO SIGNAL FILTERING TO PRODUCE A DOUBLE-SIDED IMPULSE RESPONSE

(75) Inventors: Robert Beattie, Edinburgh; John Stuart Funnell, Southampton, both of (GB)

(73) Assignee: Tandberg Television ASA, Lysaker (NO)

( * ) Notice: Subject to any disclaimer, the term of this patent is extended or adjusted under 35 U.S.C. 154(b) by 0 days.

(21) Appl. No.: 09/281,617

(22) Filed: Mar. 30, 1999

(30) Foreign Application Priority Data

Apr. 3, 1998 (GB) .................................................. 9807211

(51) Int. Cl.$^7$ .................................................. H04N 5/213
(52) U.S. Cl. .......................................... 348/607; 382/261
(58) Field of Search .................................... 348/607, 624; 382/260, 261, 265; 708/304, 306, 320, 322; H04N 5/213

(56) References Cited

U.S. PATENT DOCUMENTS 5,159,442 * 10/1992 Mizuta .................................. 348/624

FOREIGN PATENT DOCUMENTS

| 0778707 | 6/1997 | (EP) . |
| 2575879 | 7/1986 | (FR) . |
| 2287153 | 9/1999 | (GB) . |

OTHER PUBLICATIONS

Patent Abstracts of Japan vol. 012, No. 265 (E–637), Jul. 23, 1988 & JP 63 048970A (NEC Home Electronics Ltd.) Mar. 1, 1988.

* cited by examiner

*Primary Examiner*—Sherrie Hsia
(74) *Attorney, Agent, or Firm*—Ladas & Parry

(57) ABSTRACT

Video signals are subjected to a filtering process in which the signals are multiplied by a first variable gain coefficient and a delayed sample of the signals is derived by a delay circuit and the delayed sample is multiplied by a second variable gain coefficient. The two multiplied signals are added together. The magnitudes of the first and second gain coefficients are varied in dependence upon a comparison between the input video signal relative to the delayed sample from the delay circuit and in an opposite sense to one another. By a suitable choice of the gain coefficients, the filtering process can be used to preserve the sharpness of large transitions in picture information and the impulse response of the filter can be readily modified by re-calculating the gain coefficient. The filtering process may be used in a cascade of stages to achieve filtering in vertical, horizontal and temporal domains.

17 Claims, 4 Drawing Sheets

Vertical filter, C to D
SAD=|A-B|+|C-D|+|E-F|

Horizontal filter, C to D
SAD=|A-B|+|C-D|+|E-F|

Frame n-1

Temporal filter, C to D
SAD=|A-B|+|C-D|+|E-F|

Frame n

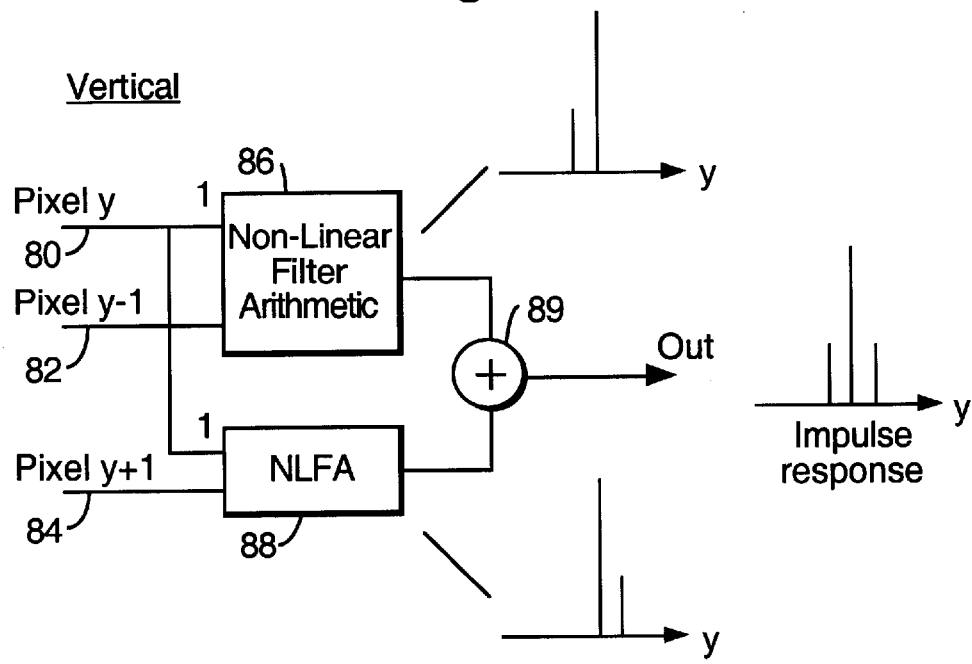
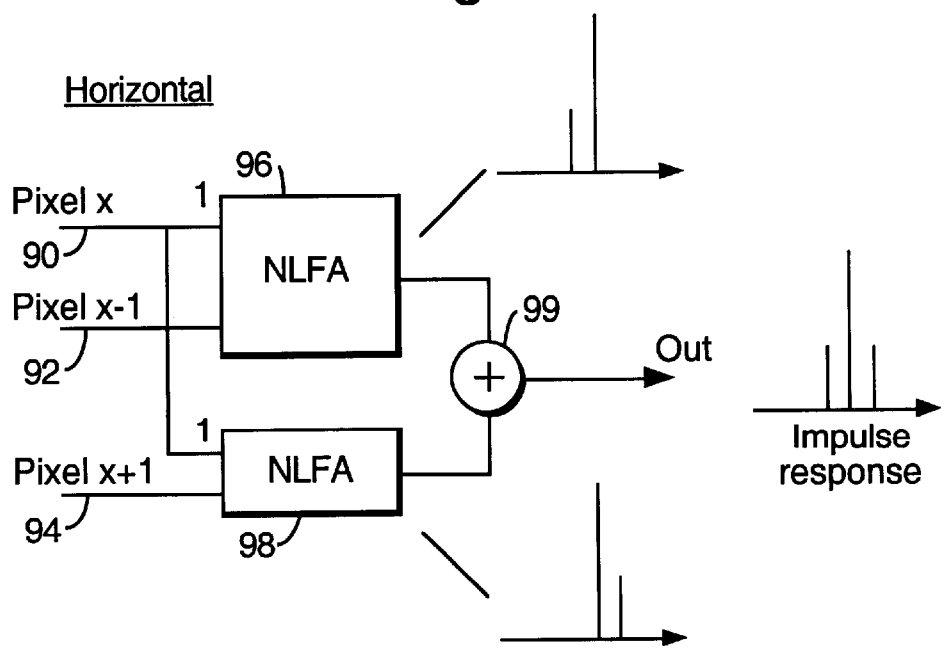

DIGITAL VIDEO SIGNAL FILTERING TO PRODUCE A DOUBLE-SIDED IMPULSE RESPONSE

BACKGROUND OF THE INVENTION

1. Field of the Invention

The present invention relates to the filtering of digital video signals and has particular application to the filtering of noise from video signals.

Digital video signals often include noise. The noise can either be intrinsic to the process by means of which the signal has been generated or it may have been introduced by later processing of the signal during storage or transmission of the signal.

2. Description of the Related Art

Noisy video signals are difficult to compress and it is a common step to filter out the noise prior to compression. At the data rates used for video signals it is important that the filter used is computationally simple and efficient. It is also important the filter should be able to adapt to changes in the underlying scene statistics.

The recursive filters that have been employed in the past to filter digital video signals often produce visible artifacts and are generally of relatively low performance. It is the aim of the present invention to provide filtering of digital video signals in a manner that is computationally simple and efficient.

SUMMARY OF THE INVENTION

According to the present invention there is provided a method of filtering an input digital video raster signal to produce a double sided impulse response in the time domain, the method comprising the steps of; applying the input video signal to a filter apparatus having one adaptive filter producing an impulse response on one side of the time domain and another adaptive filter producing an impulse response on the other side of the time domain, comparing each pixel of the video signal to adjacent pixel samples in the video raster to generate gain coefficient values for the pixels of the video signal, and adapting the impulse response of each filter by means of the generated gain coefficient values.

Further according to the present invention there is provided apparatus for filtering an input digital video raster signal to produce a double sided impulse response in the time domain, the apparatus comprising; an adaptive filter producing an impulse response on one side of the time domain and another adaptive filter producing an impulse response on the other side of the time domain, and a gain coefficient generator to compare each pixel of the video signal to adjacent pixel samples in the video raster and to generate therefrom gain coefficient values for the pixels of the video signal, each filter being connected to vary its impulse response to gain coefficient values generated by means of the gain coefficient generator. The invention has the advantage that a cascade of stages of filtering can be employed to filter a video signal in a vertical, a horizontal and a temporal dimension. The filtering may be made non-linear so that, in the spatial dimensions, sharp edges are preserved and, so that in the temporal dimension, no trails are left behind objects seen in moving scenes. At least some of the cascaded stages may include a forward filter path in addition to a recursive filter path to provide a double-sided impulse response.

BRIEF DESCRIPTION OF THE DRAWINGS

The invention will now be described, by way of example, with reference to the accompanying drawings in which:

FIG. 8 is a diagram showing an alternative embodiment of the vertical filter shown in FIG. 2.

FIG. 9 is a diagram showing an alternative embodiment of the horizontal filter shown in FIG. 3.

DESCRIPTION OF THE PREFERRED EMBODIMENTS

Figure 1:
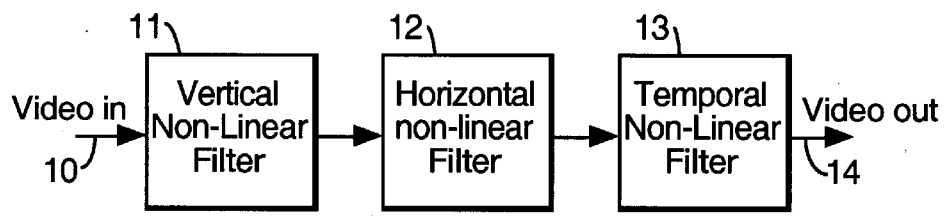
FIG. 1, shows a three-stage filter apparatus according to the present invention for filtering a digital video signal.

In FIG. 1, an input digital video signal is applied to an input terminal 10 of a filter apparatus having a cascade of three stages 11, 12 and 13. The filter apparatus produces a filtered output digital signal at an output terminal 14. The filter stage 11 is a vertical, non-linear filter stage, the filter stage 12 is a horizontal, non-linear filter stage and the filter stage 13 is a temporal, non-linear filter stage. The filter apparatus is adapted to filter video signals that represent a succession of picture frames in which each frame is made up of a series of lines of pixels. The filter stage 11 is shown in greater detail in FIG. 2. The input video signal is applied to a first delay circuit 15 which delays the video signal by one line of a frame. The output from the delay circuit 15 is applied to a first input of a non-linear arithmetic filter 16. The video signal at the input terminal 10 is applied directly to a second input of the filter 16 and the output from the filter 16 is applied to a first input of a second non-linear filter 17. The output from the filter 17 is supplied to a second delay circuit 18 which derives a delayed recursive sample of the output. The recursive sample is delayed by one line of a frame before being supplied to a second input of the filter 17. The filtered output from the filter stage 11 appears at the stage output terminal 19.

Figure 3:
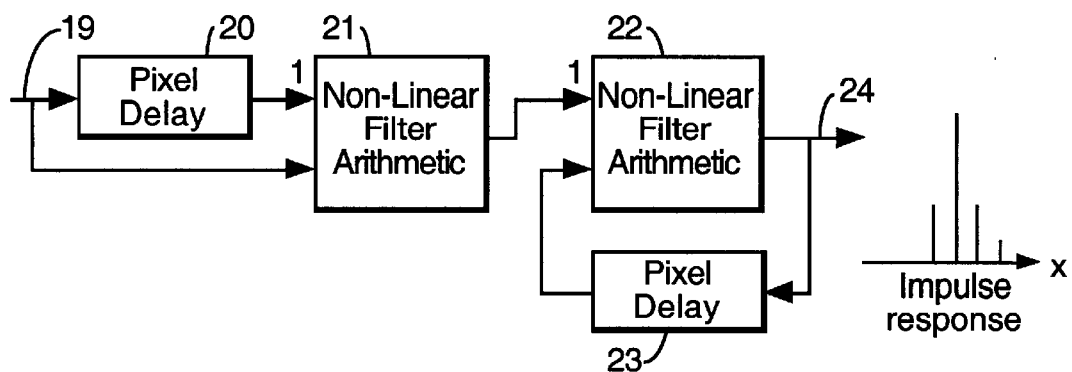
FIG. 3, shows a horizontal filter stage included in the apparatus of FIG. 1.

In FIG. 3 the second filter stage 12 is shown to receive the filtered signal on the terminal 19. The terminal 19 is connected to a pixel delay circuit 20 that delays the signal on terminal 19 by one pixel. The output from the delay circuit 20 is connected to a first input of a non-linear arithmetic filter 21. The terminal 19 is connected directly to a second input of the filter 21, and the output from the filter 21 is connected to a first input of a second non-linear arithmetic filter 22. The output from the filter 22 is connected to a pixel delay circuit 23 that derives a delayed recursive sample of the output from the filter 22.

The recursive sample is delayed by one pixel before being applied to a second input of the filter 22. The filtered output from the filter 22 appears at an output terminal 24.

Figure 4:
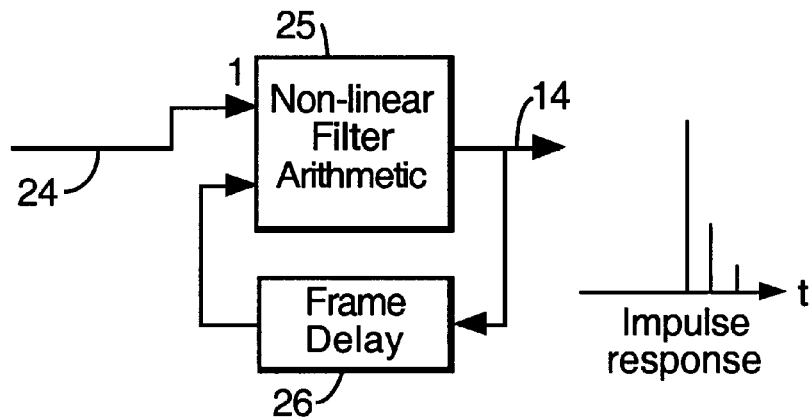
FIG. 4, shows a temporal filter stage included in the apparatus of FIG. 1.
Figure 5:
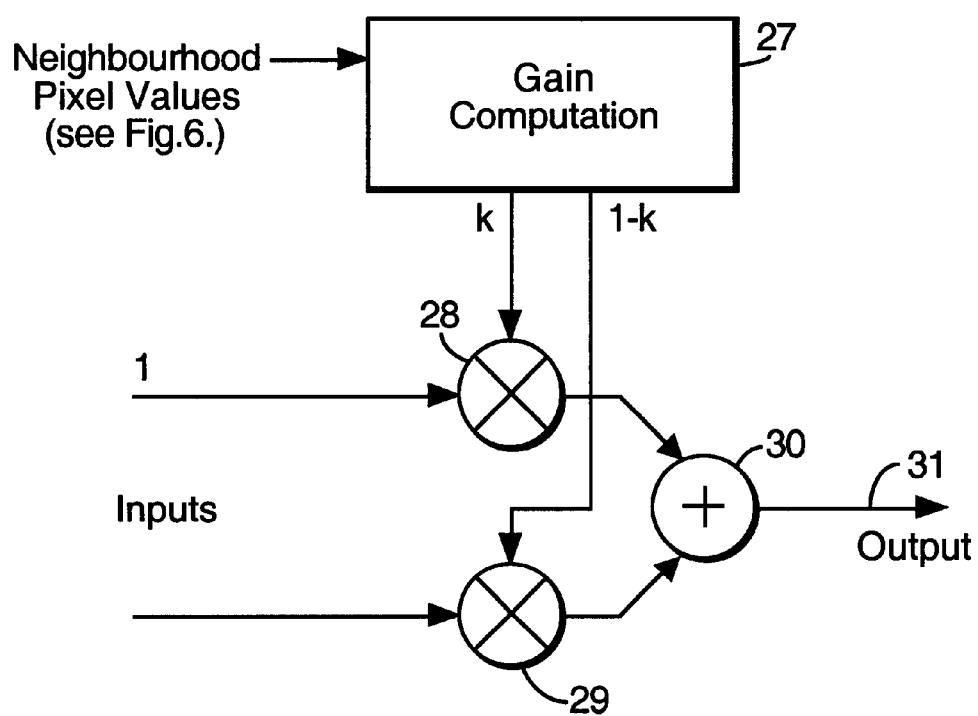
FIG. 5, shows detail of a filter circuit for use in the filter stage of FIG. 2, FIG. 3 or FIG. 4.
Figure 6:
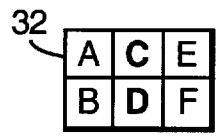
FIG. 6, is an explanatory diagram of the pixels selected for generating difference signals to be applied in the filter stages of FIGS. 2, 3 and 4, and, FIG. 7 shows an alternative filter stage, according to the invention, to replace the filter stage of FIG. 2 or FIG. 3.
Figure 6:
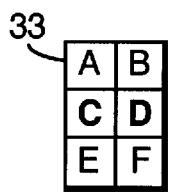
Figure 6:
Figure 6:

In FIG. 4, the third filter stage is shown to receive the filtered signal on the terminal 24. The terminal 24 is connected to a non-linear arithmetic filter 25 which has its output connected to the output terminal 14. The output from the filter 25 is connected to a frame delay circuit 26 that derives a delayed recursive sample of the output. The recursive sample is delayed by one frame of the video signal before being supplied to a second input of the filter 25. FIG. 5 shows the detail of the non-linear arithmetic filters of the filter stages 11,12 and 13. The arithmetic filter shown in FIG. 5 includes a gain computation circuit 27 connected to receive the two inputs of the filter 16. The filter also has two multipliers 28 and 29 to receive the two filter inputs respectively. The gain computation circuit 27 supplies a first gain coefficient (k) to the multiplier 28 is and a second gain coefficient (1-k) to the multiplier 29. The multipliers 28 and 29 have output terminals connected to supply an adder 30 from which the filter supplies a filtered output signal at an output terminal 31. In operation, the input digital video signal is applied to the vertical filter stage 11 so that the two inputs to the non-linear arithmetic filter 16 comprise the input digital signal and a delayed sample of the input digital signal, where the delay is equal to one line. The gain calculation circuit takes the two inputs and performs a calculation to derive the sum of the absolute differences (SAD) which is a comparison between pixels in a line represented by the input video signal and pixels in a line represented by the delayed sample of the input digital signal. In FIG. 6, the pixels A to F in the block 32 are taken into account in deriving the sum of absolute differences in the vertical filter 16.

The pixels A, C and E are included in one line and the pixels B, D and F are included in the next line. The sum of the absolute differences is calculated according to the relation:

$$SAD=|A-B|+|C-D|+|E-F| \quad \text{(equation 1)}$$

The gain calculation circuit progressively performs the calculation of SAD for each pixel along the lines of pixels represented in the digital video signal. The result of each calculation is an address of a gain coefficient memory in the gain calculation circuit 27 of the filter. The address is applied to the gain coefficient memory to read out a value for the first gain coefficient (k). The value of the second gain coefficient (1-k) is derived from the coefficient (k) and the two gain coefficients are applied to the multipliers 28 and 29 of the filter circuit 16. The two gain coefficients sum to unity. The filtered output from the filter 16 is supplied to the filter 17. The two inputs to the non-linear arithmetic filter 17 comprise the filtered signal from the filter 16 and a delayed recursive sample of the output from the filter 17, where the delay is equal to one line. The gain calculation circuit for the filter 17 performs a calculation to derive the sum of the absolute differences (SAD) between pixels in a line represented by the input video signal and pixels in a line represented by the recursive sample of the output from the filter 17. The calculation in the filter 17 is on a block such as the block 32 in FIG. 6 but in this case the pixels are compared in lines which are displaced relative to the lines used in the comparison in the filter 16. The calculation is again based on the relation in the equation (1) referred to above. The impulse response obtained by the filters 16 and 17 in the vertical (y) direction is shown at the right-hand side of FIG. 2. It will be seen that the response is double sided because the filter 16 makes a forward comparison between lines of pixels and the filter 17 makes a recursive comparison between lines of pixels.

The horizontal filter stage 12 including the filters 21 and 22 operates in a manner analogous to the vertical filter stage 11. The operation of the horizontal filter stage 12 depends on the delays in the delay circuits 20 and 23 being one pixel rather than one line. In consequence of this, the horizontal filter 21 performs a comparison between pixels in a column represented by the video signal and pixels in a column represented by the delayed sample of video signal as shown in the block 33 in FIG. 6. The comparison is performed by calculating the sum of the absolute differences (SAD) between the pixels according to the equation (1) already referred to but in this case the differences are related to the pixels indicated in block 33 of FIG. 6.

The horizontal filter 22 performs a comparison between pixels in a column represented by the video signal from the filter 21 and pixels in a column represented by the delayed recursive sample of the output from the filter 22, where the delay is one pixel. The calculation in the filter 22 is on a block such as the block 33 but in this case the pixels are compared in columns that are displaced relative to the columns used in the comparison in the filter 21. The calculation is again based on the relation in equation (1) referred to above. The impulse response obtained by the filters 21 and 22 in the horizontal (x) direction is shown at the right-hand side of FIG. 3 and can be seen to be a double-sided response. This is because the filter 21 makes a forward comparison between columns of pixels and the filter 22 makes a recursive comparison between columns of pixels.

The temporal filter stage 13 including the filter 25 operates in a manner analogous to the vertical and horizontal stages 11 and 12 except that it includes one non-linear filter instead of two non-linear filters. The non-linear filter 25 performs a comparison between pixels in a frame (n-1) of the video signal with pixels in a recursive frame (n). The comparison is performed by calculating the sum of the absolute differences between the pixels according to the equation (1) already referred to but in this case the differences are related to three pixels from frame (n-1) and three pixels from frame (n) as shown in FIG. 6. The impulse response in the time dimension (t) is seen to be single sided as shown at the right-hand side of FIG. 4. This is because there is one non-linear filter in the temporal filter stage 13 rather than two. It would be possible to include two filter stages in the temporal filter stage 13 in like manner to the vertical and horizontal filter stages 11 and 12. However, the storage demands of delaying the video signal by one frame means that the compromise of a single-sided response in the temporal filter stage is justified in relation to the extra cost of storing the video signal by one frame in an additional filter.

The magnitudes of the two gain coefficients addressed by the gain calculation circuit for each of the non-linear filters 16, 17, 21, 22, 25, (and 86, 88, 96 and 98 described later herein) are predetermined and stored in the respective memory of that filter. The sum of the absolute differences of the compared pixels is used to address the gain coefficients in each of the respective memories. The gain coefficients are chosen to filter more heavily in flat areas of little contrast and (k) is chosen to have a value typically of 0.78 in such areas. Where there is a marked change in the region's pixel values, for example at a distinct edge, the gain coefficients are chosen to filter more lightly or even not at all. The values of (k) may vary within a range from 0.6—for heavier filtering to 1.0 for no filtering at all while the values of (1-k) vary correspondingly between 0.4 and 0. The gain coefficients may be calculated in realtime by a suitably programmed calculator instead of being predetermined and stored. The order of the cascaded filter stages 11, 12 and 13 may be modified so that the input signal is filtered in the vertical, horizontal and temporal dimensions in any chosen order.

Figure 7:
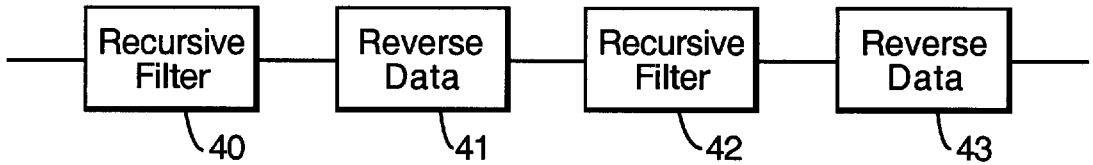

In FIG. 7 there is shown an alternative filter stage, according to the invention, which can be used in place of the vertical filter stage 11, or the horizontal filter stage 12. The filter stage in FIG. 7 comprises a first recursive filter 40, a data reversal buffer 41, a second recursive filter 42 and a second data reversal buffer 43, all connected in serial fashion.

Figure 2:
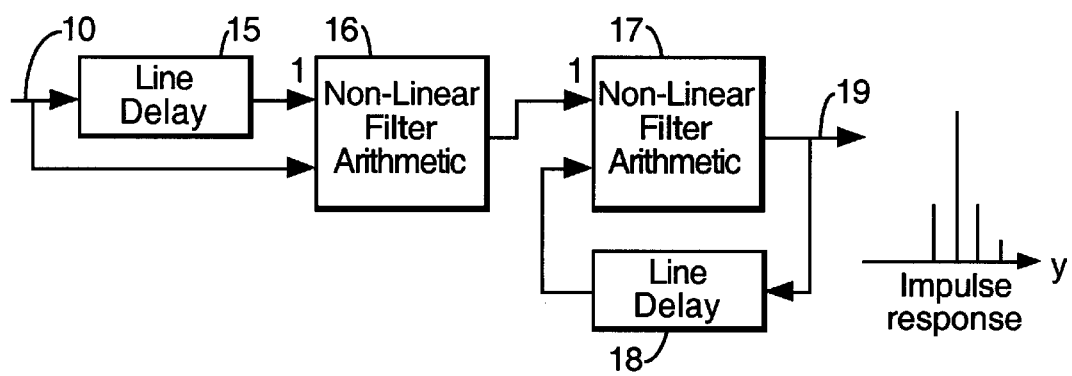
FIG. 2, shows a vertical filter stage included in the apparatus of FIG. 1.

When used in place of the vertical filter stage of FIG. 2, the first recursive filter 40 is constructed in like manner to the recursive filter including the non-linear arithmetic filter 17 and line delay 18. The data reversal buffer is adapted to receive data representing each line of pixels and to read out the lines of pixels in reverse order for supply to the second recursive filter 42. The second recursive filter 42 is constructed in like manner to the first recursive filter 40. The data reversal buffer 43 is adapted to reverse lines of pixels in like manner to the reversal buffer 41. Thus the filter of FIG. 7 will provide a bi-recursive filter action on the incoming video signal and it will be apparent that the filter response will be both double sided in the time domain and symmetrical. The overhead for making the filter response symmetrical is that provision has to be made for data storage in the data reversal buffers.

When the filter of FIG. 7 is to be used in place of the horizontal filter stage 12, each recursive filter 40 and 42 is constructed in like manner to the recursive filter of FIG. 3 including the non-linear arithmetic filter 22 and the pixel delay 23. The data reversal buffers 41 and 43 reverse the data pixel by pixel.

FIG. 8 is a diagram showing an alternative embodiment of the vertical filter shown in FIG. 2. Video inputs, 80 and 82, supply a pixel y and the pixel vertically above pixel y (i.e. pixel y−1) to a non-linear filter arithmetic (NLFA) block 86. Video inputs 80 and 84 supply the pixel y and the pixel vertically below pixel y (i.e. pixel y+1) to a second non-linear filter arithmetic (NLFA) block 88. The output from NLFA 86 has a one-sided impulse response, and the output from NLFA 88 has a complementary one-sided impulse response. The outputs from NLFA 86 and 88 are combined at an adder 89 to produce an output having a two-sided symmetrical impulse response.

FIG. 9 is a diagram showing an alternative embodiment of the horizontal filter shown in FIG. 3. Video inputs, 90 and 92, supply a pixel x and the pixel preceding above pixel x (i.e. pixel x−1) to a non-linear filter arithmetic (NLFA) block 96. Video inputs 90 and 94 supply the pixel x and the pixel following pixel x (i.e. pixel x+1) to a second non-linear filter arithmetic (NLFA) block 98. The output from NLFA 96 has an one-sided impulse response, and the output from NLFA 98 has a complementary one-sided impulse response. The outputs from NLFA 96 and 98 are combined at an adder 99 to produce an output having a two-sided symmetrical impulse response.

One advantage of using the alternative embodiments shown in FIG. 8 and FIG. 9 is in ease of implementation.

What has been specifically described is a method and apparatus in which a video signal is filtered to remove noise in a cascade of filter stages. Each stage has an input video signal that is multiplied by a first variable gain coefficient (k) and a recursive sample of the output video signal multiplied by a second variable gain coefficient (1-k). The multiplied signals are added to form the output from the filter stage. The first and second gain coefficients (k) and (1-k) are varied in dependence upon the difference between the input video signal and the delayed recursive sample of the output video signal. Since the gain coefficients are (k) and (1-k), the two coefficients vary in the opposite sense to one another.

An advantage of the invention is that marked changes in pixel values (at a distinct edge for example) are not filtered out and the sharpness of large transitions is preserved. The temporal filter acts to prevent visible trails being left behind objects in moving scenes. A further advantage is that the impulse response of the filter stages may be easily modified by appropriate recalculation of the stored coefficient values.

It will be apparent that the invention may be applied to filtering a video signal to remove noise, or, in the alternative, may be applied to removing visually unimportant high frequency detail. Such detail may be present in high definition television (HDTV) signals for example. It will also be apparent that the invention may be modified to omit the temporal filter stage 13 and to include only the spatial filter stages 11 and 12.

The invention thus described allows each filter stage to be considered in relation to its is own individual dimension which is separable from the other dimensions. The response of each filter stage may be either a symmetrical or approximately symmetrical response. If all 3 dimensions are symmetrical this may be thought of as a 3 dimensional cascaded filter system. If one of the 3 dimensions is approximately symmetrical, this may be thought of as a 2.5 dimensional response.

What is claimed is:

1. A method of filtering an input digital video raster signal to produce a double sided impulse response, the method comprising the steps of;

applying the input video signal to a filter apparatus having one adaptive filter producing an impulse response on one side of an origin and another adaptive filter producing an impulse response on the other side of the origin, comparing each pixel of the video signal to adjacent pixel samples in the video raster to generate gain coefficient values for the pixels of the video signal, and adapting the impulse response of each filter by means of the generated gain coefficient values.

2. A method as claimed in claim 1, further comprising filtering the input video signal through a non-linear filter and a recursive filter.

3. A method as claimed in claim 1, further comprising filtering the input video signal through two recursive filters connected through a data reversal buffer, the output of which is passed through a second reversal buffer.

4. A method as claimed in claim 1, further comprising filtering the video signal through each filter by multiplying the input signal by a first gain coefficient, deriving a delayed sample of the video signal, multiplying the delayed sample by a second gain coefficient, adding the multiplied signals and varying the magnitudes of the gain coefficients in the opposite sense to one another.

5. A method as claimed in claim 4, in which the step of deriving a delayed sample of the video signal in each filter comprises delaying the sample by a line of pixels.

6. A method as claimed in claim 4, in which the step of deriving a delayed sample of the video signal in each filter comprises delaying the sample by a pixel.

7. A method as claimed in claim 4, in which the step of deriving a delayed sample of the video signal in each filter comprises delaying the sample by a picture frame.

8. Apparatus for filtering an input digital video raster signal to produce a double side impulse response, the apparatus comprising;

an adaptive filter producing an impulse response on one side of an origin and another adaptive filter producing an impulse response on the other side of the origin, and a gain coefficient generator to compare each pixel of the video signal to adjacent pixel samples in the video raster and to generate therefrom gain coefficient values for the pixels of the video signal, each filter being connected to vary its impulse response to gain coefficient values generated by means of the gain coefficient generator.

9. Apparatus as claimed in claim 8, wherein the filters include a non-linear filter and a recursive filter.

10. Apparatus as claimed in claim 8, wherein the filters include two recursive filters connected through a data reversal buffer the output of which is passed through a second reversal buffer.

11. Apparatus as claimed in claim 8, wherein each filter includes a first multiplier to multiply the input signal by a first gain coefficient, a delay device for deriving a delayed sample of the video signal, a second multiplier for multiplying the delayed sample by a second gain coefficient, and an adder for adding the multiplied signals, the gain coefficient generator being adapted to vary the magnitudes of the gain coefficients in the opposite sense to one another.

12. Apparatus as claimed in claim 11, wherein the delay device is adapted to delay the sample of the video signal by a line of pixels.

13. Filter apparatus for filtering an input digital video raster signal to produce a double sided impulse response in the time domain, the apparatus comprising a cascade of stages including a vertical filtering stage comprising the filter apparatus of claim 12.

14. Apparatus as claimed in claim 11, wherein the delay device is adapted to delay the sample of the video signal by one pixel.

15. Filter apparatus for filtering an input digital video raster signal to produce a double sided impulse response in the time domain, the apparatus comprising a cascade of stages including a horizontal filtering stage comprising the apparatus of claim 14.

16. Apparatus as claimed in claim 11, wherein the delay device is adapted to delay the sample of the video signal by one picture frame.

17. Filter apparatus for filtering an input digital video raster signal to produce a double sided impulse response in the time domain, the apparatus comprising a cascade of stages including a temporal filtering stage comprising the filter apparatus of claim 16.

* * * * *